United States Patent
Schmidt et al.

(10) Patent No.: US 9,549,380 B2
(45) Date of Patent: Jan. 17, 2017

(54) SYSTEM AND METHOD FOR MANAGING RF SIGNAL AGGREGATION AT GEO-TRACT BOUNDARIES

(71) Applicant: Spectrum Bridge, Inc., Lake Mary, FL (US)

(72) Inventors: Jeffrey C. Schmidt, Orlando, FL (US); Robin U. Roberts, Orlando, FL (US); Thomas C. Evans, Lakeland, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 0 days.

(21) Appl. No.: 15/179,406

(22) Filed: Jun. 10, 2016

(65) Prior Publication Data

US 2016/0366655 A1    Dec. 15, 2016

Related U.S. Application Data

(60) Provisional application No. 62/173,735, filed on Jun. 10, 2015.

(51) Int. Cl.
| | |
|---|---|
| *H04W 8/00* | (2009.01) |
| *H04W 52/34* | (2009.01) |
| *H04W 16/14* | (2009.01) |
| *H04W 52/28* | (2009.01) |
| *H04W 52/24* | (2009.01) |

(52) U.S. Cl.
CPC ........... *H04W 52/346* (2013.01); *H04W 16/14* (2013.01); *H04W 52/247* (2013.01); *H04W 52/283* (2013.01)

(58) Field of Classification Search
CPC .. H04W 48/04; H04W 52/146; H04W 52/367; H04W 72/04
See application file for complete search history.

(56) References Cited

U.S. PATENT DOCUMENTS

| | | | | |
|---|---|---|---|---|
| 8,364,188 | B2 * | 1/2013 | Srinivasan | H04J 11/0023 370/252 |
| 8,615,250 | B2 * | 12/2013 | Xing | H04W 16/14 370/231 |
| 8,934,923 | B1 | 1/2015 | Golden | |
| 9,253,781 | B2 * | 2/2016 | Kim | H04W 72/048 |

(Continued)

OTHER PUBLICATIONS

Ali Abdi, et al., "On the PDF of the Sum of Random Vectors," IEEE Transactions on Communications, vol. 48, No. 1, Jan. 2000, pp. 1-14.

(Continued)

*Primary Examiner* — Bobbak Safaipour
(74) *Attorney, Agent, or Firm* — Tucker Ellis LLP

(57) ABSTRACT

Spectrum that is shared by two or more radio devices that operate near a boundary of a tract is managed by a spectrum management system. The system determines a closest point of approach to the boundary for each radio device and an aggregate contributed power at each closest point of approach by the emissions from the radio devices previously granted spectrum access to the shared spectrum. A transmit power limit for the requesting radio device is determined at each closest point of approach. Spectrum access is granted to a requesting radio device and the granted spectrum access includes an authorized transmit power limit that does not exceed the smallest one of the transmit power limits.

20 Claims, 9 Drawing Sheets

(56) References Cited

U.S. PATENT DOCUMENTS

| | | | |
|---|---|---|---|
| 9,317,669 B1* | 4/2016 | Gray | G06F 21/31 |
| 9,439,103 B2* | 9/2016 | Pesola | H04W 28/048 |
| 2011/0256884 A1* | 10/2011 | Kazmi | H04W 48/04 |
| | | | 455/456.1 |
| 2011/0299479 A1 | 12/2011 | Deb | |
| 2013/0059615 A1* | 3/2013 | Wang | H04W 52/46 |
| | | | 455/501 |
| 2013/0065511 A1* | 3/2013 | Wu | H04W 72/082 |
| | | | 455/7 |
| 2014/0161002 A1* | 6/2014 | Gauvreau | H04W 16/24 |
| | | | 370/280 |
| 2015/0326463 A1* | 11/2015 | Solondz | H04L 43/0829 |
| | | | 370/252 |
| 2016/0205679 A1* | 7/2016 | Yoo | H04L 1/0026 |
| | | | 370/329 |

OTHER PUBLICATIONS

International Search Report and Written Opinion from corresponding International Patent Application No. PCT/US2016/036974, mailed Sep. 7, 2016.

* cited by examiner

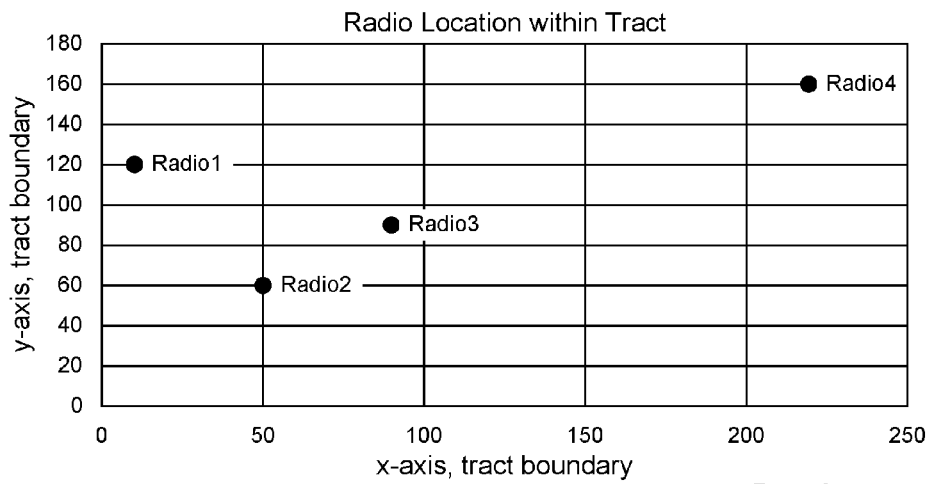
FIG. 6A
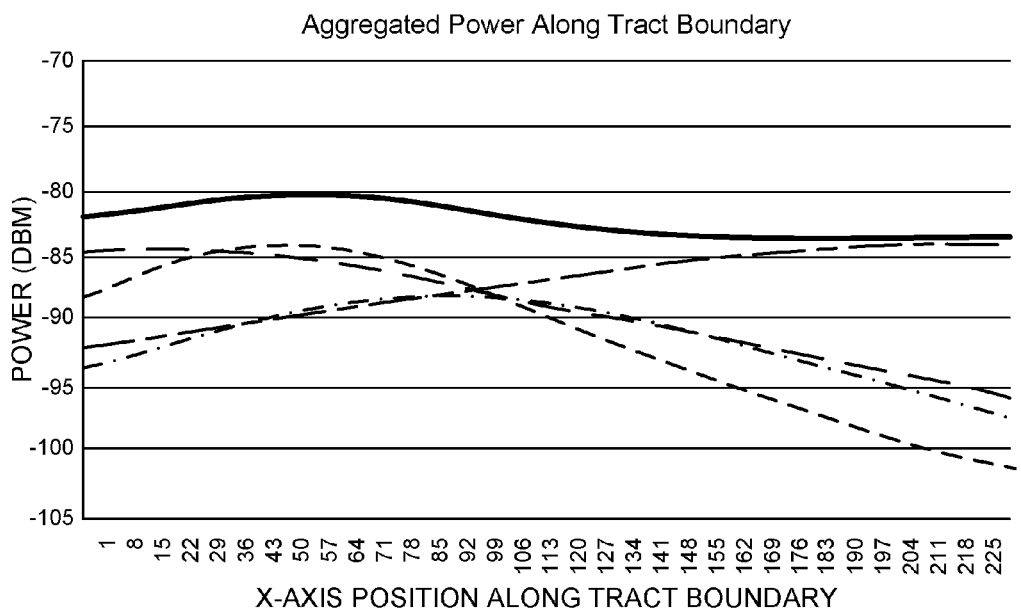
FIG. 6B
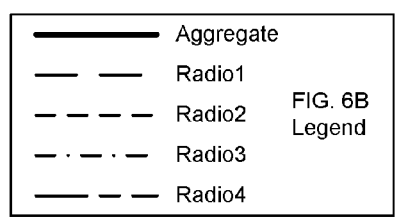

SYSTEM AND METHOD FOR MANAGING RF SIGNAL AGGREGATION AT GEO-TRACT BOUNDARIES

RELATED APPLICATION DATA

This application claims the benefit of U.S. Provisional Patent Application No. 62/173,735, filed Jun. 10, 2015, the disclosure of which is incorporated herein by reference in its entirety.

TECHNICAL FIELD OF THE INVENTION

The technology of the present disclosure relates generally to wireless communications and, more particularly, to a system and method for determining the allowable transmit power for each of multiple distributed radios in a manner that manages radio frequency (RF) signal aggregation at locations of interest, such as a geo-tract boundary.

BACKGROUND

Spectrum sharing is thought of as one of the most viable ways of improving the amount of spectrum available to wireless networks and other radio devices for conducting wireless communications. But regulations hold that radios using shared spectrum in a permitted area must not cause impermissible interference in an adjacent protected area. Since emissions of multiple radios that share spectrum may aggregate, there is concern that impermissible interference may readily result in certain sharing environments.

Regulators have begun to consider this situation. For instance, in the U.S., the Federal Communications Commission (FCC) adopted "Report and Order and Second Further Notice of Proposed Rulemaking" under FCC 15-47 on Apr. 17, 2015 (released Apr. 21, 2015). FCC 15-47, in part, states:
  Received Signal Strength Limits
  191. Background. In the FNPRM, we indicated that the SAS should have a baseline threshold for the maximum permitted aggregate signal level from all CBSDs at the borders of PALs. We stated that Citizens Broadband Radio Service users should ensure that the aggregate signal level from their CBSDs as well as the aggregate transmissions from their associated End User Devices at the edge of their authorized service boundaries remain at levels that would not harm other CBSDs in the same or adjacent service areas. For small cell networks, industry standards and studies have shown, so long as interference rise over noise (IoT) remains at or below 20 dB and 55 dB for picocells and femtocells, respectively, performance is not impaired. Based on the industry studies, and taking into account reasonable distance between authorized user operations, we proposed a maximum aggregate signal level threshold of −80 dBm with reference to a 0 dBi antenna in any 10 megahertz bandwidth, at a height of 1.5 meters above the ground level, anywhere along the boundary of a PAL license area. We also proposed to allow neighboring PALs to coordinate and mutually agree on higher or lower signal level thresholds. We sought comment on these proposals.
  195. Discussion. After a thorough review of the record, we believe that establishing a baseline maximum signal level along license area boundaries will help foster effective coexistence in the 3.5 GHz Band. We also find that licensees should be permitted to agree to lower or higher acceptable maximum signal levels appropriate to their particular network configurations. We believe that the aggregate −80 dBm per 10 megahertz signal threshold at the service boundaries proposed in the FNPRM is wholly appropriate for the dense cell deployments and relatively small license areas that we expect in this band. Therefore, we adopt our proposal for aggregate received signal level at a PAL license boundary to be at or below an average (rms) power level of −80 dBm when integrated over a 10 MHz reference bandwidth with the measurement antenna placed at a height of 1.5 meters above ground level. We also recognize that the PAL licensees may agree to an alternative limit besides −80 dBm at their service boundaries and communicate it to an SAS. Moreover, these signal level requirements will not apply to adjacent license areas held by the same Priority Access Licensee.
  We [the FCC] recognize that ensuring compliance with this limit at the boundary is likely challenging on a real-time basis and there are legitimate questions relative to how to develop appropriate predictive models. We also recognize that the use of an aggregate metric could be challenging in a multi-user environment. We encourage any multi-stakeholder group formed to address technical issues raised by this proceeding to consider how this limit should be applied. As an initial matter, we will apply the limit through measurements at the license area boundary at times of peak activity.

SUMMARY

Disclosed are systems and methods capable of accurately characterizing the effects of signal aggregation (cumulative interference) of radios, with the goal of managing radio emissions so that the radio emissions—in the aggregate—do not exceed a specified threshold along a geometric continuum (e.g., a tract boundary). Boundaries shown in this disclosure document are linear, but the disclosed approaches are relevant to any geographic boundary, including curved boundaries and boundaries made up of straight and/or curved line segments.

The problem of managing aggregate emissions may be characterized as being heuristic, in that there is a desire to grant (with fairness) operational parameters to each radio that include allowable transmit power as near as possible to the maximum permissible, while not excluding other radios from co-existing or operating due to emission limits at a boundary.

The problem also may be characterized as being stochastic (e.g., including a random variable), in that the random phase of time varying waveforms generated by each transmitter could be considered in the aggregation process. In this regard, the following disclosure first addresses the problem using a worst case assumption of combined phase (e.g., all signals are in phase), and then considers the real-world effects of random phase.

BRIEF DESCRIPTION OF THE DRAWINGS

FIGS. 6A and 6B contain data for a simulated analysis to validate the disclosed approach.

DETAILED DESCRIPTION OF EMBODIMENTS

Figure 1:
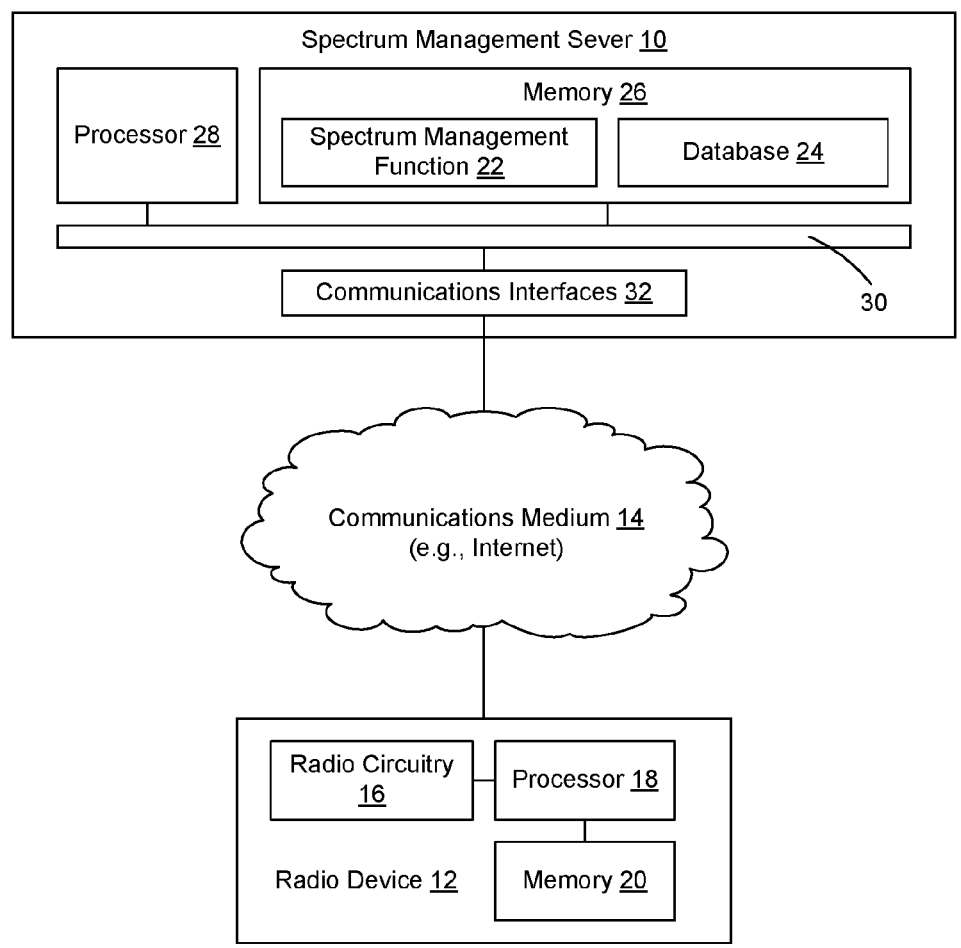
FIG. 1 is a schematic diagram of an exemplary system for managing the effects of RF signal aggregation.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. SYSTEM OVERVIEW

With reference to FIG. 1, shown is an exemplary system for managing the effects of RF signal aggregation. The system may carry out the techniques that are described in this disclosure. The system includes a server 10 that manages one or more unprotected radio devices 12 that have shared access to spectrum (e.g., one or more operating channels). The server 10 and each radio device 12 are configured to carry out the respective logical functions that are described herein.

The radio device 12 may be or may include any type of electronic device that engages in wireless communications, such a mobile device (e.g., a smart phone or tablet), a computing device, an information and/or entertainment system, an Internet connectivity device (e.g., a modem and router) for other devices, etc.

The server 10 communicates with the radio device 12 over any appropriate communications medium 14, such as one or more of the Internet, a cellular network, a WiFi network, a cable network, etc. In addition to carrying out the operations described herein, the server 10 may be a central spectrum access registration system or some other form of spectrum management platform. For instance, the server 10 may host TV white space registration services for TV band radio devices (TVBDs).

The radio device 12 is location aware. For instance, the radio device 12 may be capable of determining its position (also referred to as geo-location) using a location-determining technique, such as GPS or other technology. In some embodiments, the radio device 12 may have a GPS receiver that is used to receive GPS satellite signals from which position coordinates are triangulated. Furthermore, if the radio device 12 is a mobile device, it may be capable of manually or autonomously updating its determined position as it moves. In the case of a fixed location radio device 12, the radio device 12 may be programmed with its position or may determine its position in the same way that mobile devices determine position.

The radio device 12 includes communications circuitry, such as radio circuitry 16. The radio circuitry 16 may include one or more radio modems (e.g., radio transceivers) and corresponding antenna assemblies to allow for communications over various types of network connections and/or protocols. The radio circuitry 16 may be used to carry out various wireless communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc.

In order to carry out wireless communications on some channels, the radio device 12 may be required to operate within operating parameters that are constrained by the presence of a protected device and other devices that share spectrum access with the radio device 12. To ascertain the operating parameters, the radio device 12 may seek spectrum access credentials from the server 10. The operating parameters may include a limit on transmit power with which the radio device 12 may transmit on channels that are shared with other radio devices 12.

Overall functionality of the radio device 12 may be controlled by a control circuit that includes a processing device 18. The processing device 18 may execute code that is stored in a memory 20. For instance, the processing device 18 may be used to execute an operating system and other applications that are installed on the radio device 12. The operating system or applications may include executable logic to implement the functions of the radio device 12 that are described herein. The memory 20 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 20 includes a non-volatile memory for long term data storage and a volatile memory that functions as system memory for the control circuit.

The radio device 12 may include any other appropriate components such as, but not limited to, a display, a speaker, a microphone, a user interface (e.g., a keypad and/or a touch-sensitive input), motion sensors, etc.

The server 10 may be implemented as a computer-based system that is capable of executing computer applications (e.g., software programs), including a spectrum management function 22 that, when executed, carries out functions of the server 10 that are described herein. The spectrum management function 22 and a database 24 may be stored on a non-transitory computer readable medium, such as a memory 26. The database 24 may be used to store various information sets used to carry out the functions described in this disclosure. For instance, the server 10 may store or access data about known protected radio devices and other radio devices that have obtained spectrum access credentials from the sever 10. The memory 26 may be a magnetic, optical or electronic storage device (e.g., hard disk, optical disk, flash memory, etc.), and may comprise several devices, including volatile and non-volatile memory components. Accordingly, the memory 26 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 10 may include one or more processors 28 used to execute instructions that carry out logic routines. The processor 28 and the memory 26 may be coupled using a local interface 30. The local interface 30 may be, for example, a data bus with accompanying control bus, a network, or other subsystem.

The server 10 may have various input/output (I/O) interfaces for operatively connecting to various peripheral devices. The server 10 also may have one or more communications interfaces 32. The communications interface 32 may include for example, a modem and/or a network interface card. The communications interface 32 may enable the server 10 to send and receive data signals, voice signals, video signals, and the like to and from other computing devices via an external network. In particular, the communications interface 32 may operatively connect the server 10 to the communications medium 14.

In one embodiment, the server 10 may be configured to host the described services for a plurality of electronic devices, including the radio device 12. In some embodiments, the services may include spectrum management functions, such as providing available channel lists, providing channel access credentials to qualified radio devices upon registration or request so as to allow the radio devices to make use of spectrum for wireless communications, and other similar functions. Also, while the providing of services may be fully automated, the server 10 may host an Internet-style website for the various corresponding parties to conduct initial enrollment with the server 10, conduct manual registration if needed, access various tools and reports supplied by the server 10, and so forth. For supplying the services, the server 10 may collect spectrum usage information from various sources, including but not limited to public databases, private databases and deployed radio devices (e.g., in the form of channel use selections or spectrum sensing results). The database 24 may contain information about known spectrum users, such as protected spectrum users (sometimes referred to as incumbent spectrum users), licensed spectrum users, or radio systems that are exempt from seeking spectrum access credentials in order to operate.

In embodiments of this disclosure, the server 10 may undertake spectrum management functions other than those that are described in detail, such as responding to white space channel list requests with appropriate channel lists. Therefore, in some embodiments, the server 10 may be considered a central spectrum "database" or spectrum registration/allocation system.

B. AGGREGATE RF ENERGY MANAGEMENT

Managing aggregate RF energy at a tract boundary or other geographically-defined construct may be carried our using one or more considerations. One consideration is the geometric nature of the solution. In one embodiment, a solution is generated for amplitude aggregation at one or more "hot-spots" that occur along the tract boundary. Instead of considering aggregate power in an unbounded and continuous manner along the boundary's length, the approach considers aggregate power under a finite element analysis approach. In one embodiment, this approach is based on a "worst case" assumption where signal amplitude is considered and phase cancellation is disregarded. As will be discussed, other embodiments take random phase effects into account.

Another consideration is fairness in the allocation of transmit power limits to radio devices that share a channel. In one embodiment, the allocation approach is implemented so that contributions to worst case aggregate emissions at tract boundary hot-spots are managed equitably among the radio devices that share a channel. In this manner, newly added radios are allocated a sufficient transmit power limit to conduct wireless communications and are not permanently degraded or shut out of operation under a first-come, best served scheme.

As indicated, another consideration is application of an attenuation factor due to random phase of signals from multiple radio devices. This effect is well described in Lord Rayleigh's paper "On the Resultant of a Large Number of Vibrations of the same Pitch and of Arbitrary Phase" (1880). When considering random phase cancellation, transmit power limits are determined as a function of a probability distribution and known operational parameters.

Figure 2:
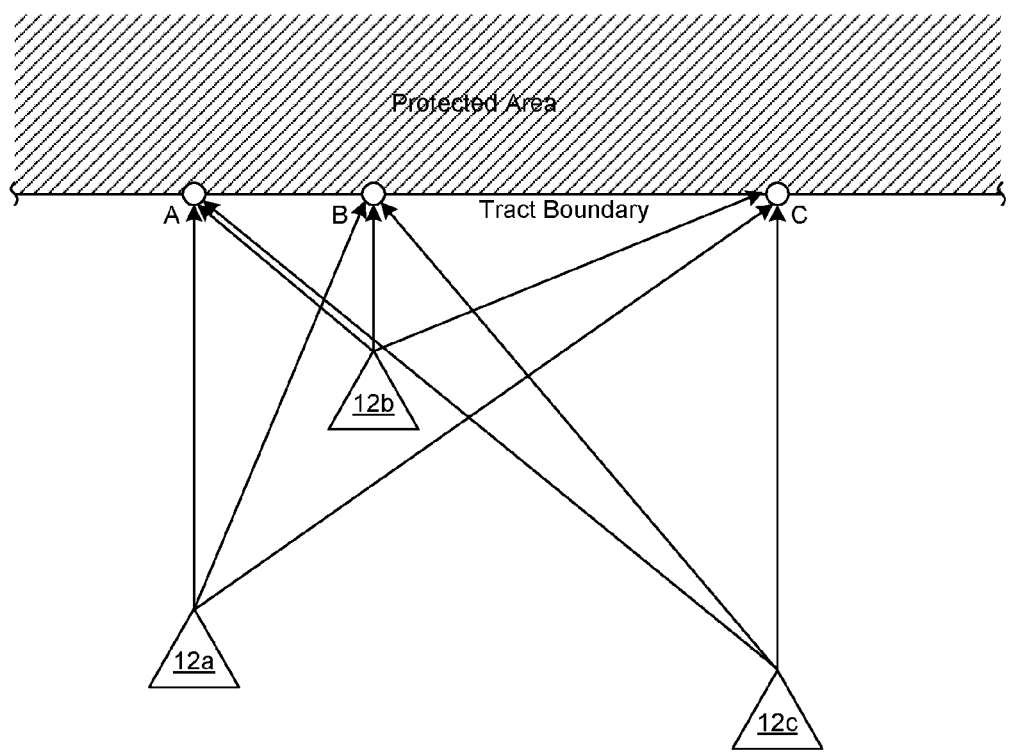
FIG. 2 is a schematic diagram of representative radio devices that share spectrum and that are deployed near a tract boundary.

With additional reference to FIG. 2, illustrated is a schematic representation of shared spectrum use by two or more radio devices. In the exemplary illustration of FIG. 2, three radio devices conduct wireless communications using shared spectrum (e.g., the same channel) near the tract boundary of a protected area in which the radio devices may not cause impermissible interference on the channel associated with the shared spectrum. In FIG. 2, the radio devices are respectively identified by reference numerals 12a, 12b and 12c. It will be appreciated that less than or more than three radio devices may share the spectrum and the illustration and description of three radio devices is merely for descriptive purposes. The operating areas of the radio devices 12 may overlap. For purposes of description, the radio devices 12 will communicate with the server 10 and request spectrum access credentials that enable the radio devices 12 to use the shared spectrum from the server 10. These requests may be made in an order in which the radio devices 12 commence operation. For purposes of description, the requests are made in the alphabetical order of the reference numerals designating each radio device 12. Therefore, radio device 12a may be referred to as a first radio, radio device 12b may be referred to as a second radio, radio device 12c may be referred to as a third radio, etc.

The server 10 will respond to each request with access credentials that allow the requesting radio device 12 to use the shared spectrum. The access credentials contain at least a transmit power limit. The transmit power limit is established by the server to maintain an aggregate emission limit at the tract boundary of less than or equal to a predetermined threshold. The predetermined threshold may be specified by regulation or by a policy imposed by the operator of radio devices in the protected area. For purposes of illustrative description, a predetermined threshold of −80 dBm will be used as an exemplary predetermined aggregate signal power limit. In the aggregate, the emissions from the radio devices 12 that share the shared spectrum (e.g., channel that is protected on the opposite side of the tract boundary from the radio devices 12) may not exceed the predetermined aggregate signal power limit at any point along the tract boundary.

FIG. 2 generally depicts the general manner in which aggregate RF energy management is addressed. In the illustrated embodiment, the aggregate power from the radio devices 12 is considered at each of plural hot-spots, each of which are located at points on the tract boundary. Points and segments of the tract boundary between hot-spots are ignored for computational simplicity. As will be demonstrated below, however, the described hot-spots are shown to be the most relevant points along the tract boundary.

In one embodiment, a hot-spot is established for each radio device 12. The hot-spot is located at a point along the tract boundary at which the radio device 12 has its closest point of approach to the tract boundary. In one embodiment, the closest point of approach is defined geometrically. For example, the closet point of approach may be the point on the tract boundary that has the shortest straight line distance to the radio device 12 than all other points on the tract boundary. The shortest straight line distance may be determined, for example, by increasing the radius of a circle having the radio device at its center and identifying the point at which the circle first touches the tract boundary. Under this embodiment, and referring to FIG. 2, hot-spot A corresponds to radio device 12*a*, hot-spot B corresponds to radio device 12*b* and hot-spot C corresponds to radio 12*c*.

In the foregoing embodiment, terrain, obstacles, radio characteristics (e.g., antenna gain profile) and other factors are not considered. But factors other than just distance could be considered. Therefore, in one embodiment, the closest point of approach is the point along the tract boundary that receives the highest induced power from the radio device than any other point. In this embodiment, the closet point of approach is determined as a function of signal propagation. For example, a path loss model may be used to determine the point on the tract boundary that is predicted to experience the highest signal amplitude from the radio device than any other point along the tract boundary. In defining the hot-spot, this approach may take into consideration factors such as terrain, obstacles, radio characteristics (e.g., antenna gain profile and antenna height), etc.

Figure 3:
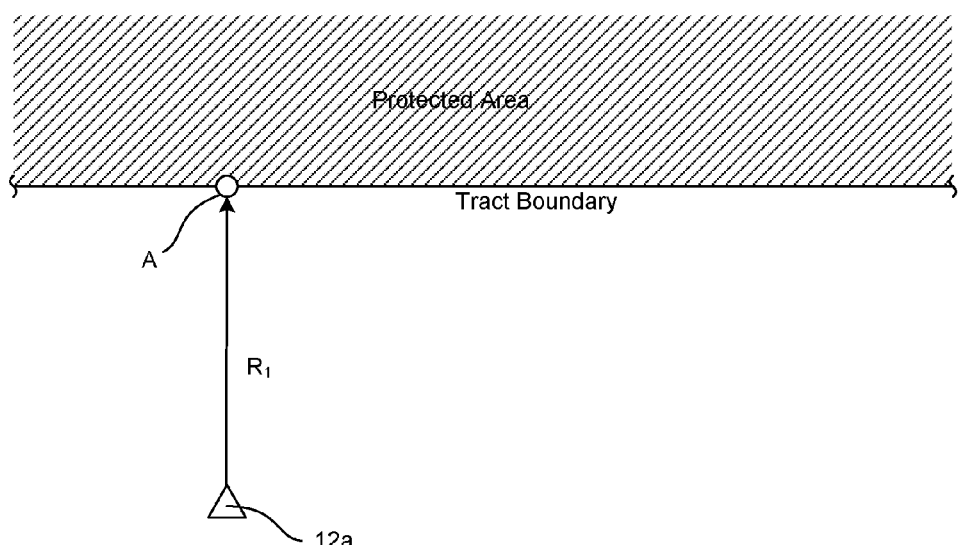
FIGS. 3-5 are schematic diagrams illustrating the management of aggregate RF energy at the tract boundary for the representative radio devices shown in FIG. 2.
Figure 4:
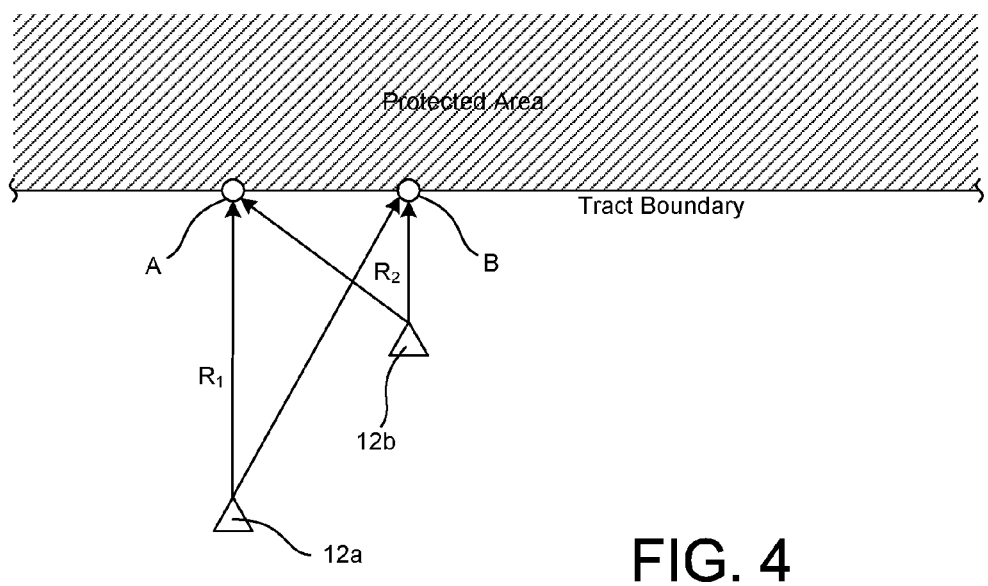
Figure 5:
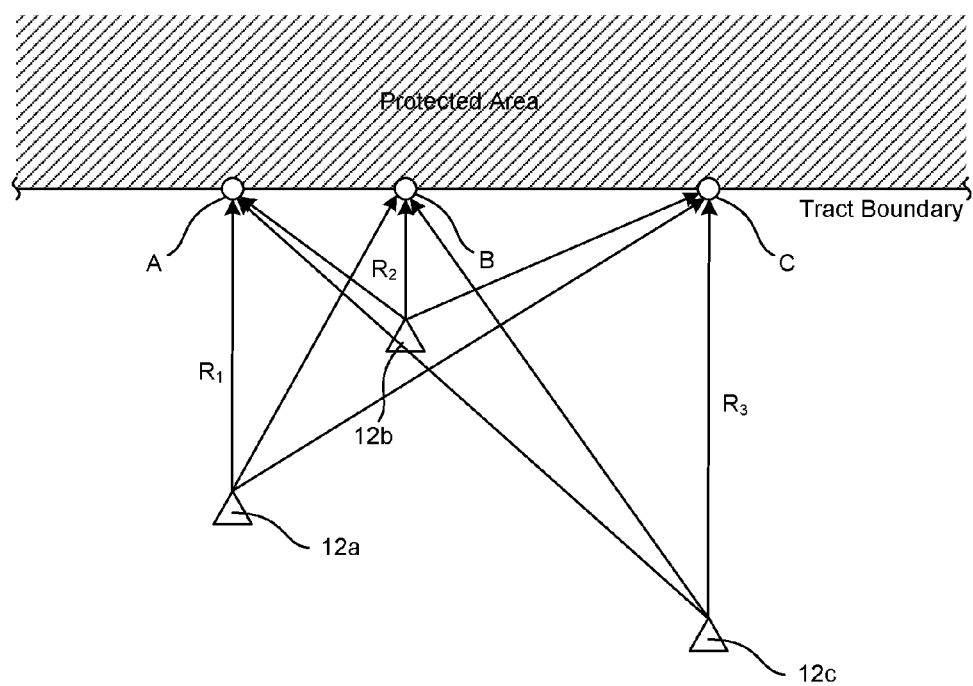

Referring now to FIGS. 3-5, management of aggregate RF energy at the tract boundary by radio devices that share spectrum for wireless communications will be described. The description will be made with reference to an example in which the radio devices 12*a*, 12*b* and 12*c* from FIG. 2 arrive sequentially and request spectrum access from the server 10 in alphabetical order by reference numeral. Also, the predetermined aggregate emission limit (also referred to as a boundary limit) at the tract boundary in the example is −80 dBm. In this example, only amplitude of signals from the radio devices 12 is considered and the time-varying effects of random phase are ignored. In this example, the closest point of approach is determined as a function of distance only.

FIG. 3 shows the presence of the first radio device 12*a* near the tract boundary. The first radio device 12*a* is located a distance $R_1$ from the tract boundary. The first radio device 12*a* makes a request for spectrum access from the server 10. The server 10 then returns a spectrum allocation (e.g., spectrum access credentials) containing a transmit power limit that is determined to keep emissions from the radio device 12*a* at the tract boundary at or below the predetermined aggregate emission limit. Since the first radio device 12*a*, at this point in time, is the only radio device that is known to the server 10 to use or desire to use the shared spectrum, the server 10 may determine the transmit power limit based on the operations of the first radio device 10 and without consideration to other radio devices.

A theoretical transmit power limit for the radio device 12*a* may be determined by solving equation 1 in which the path loss along $R_1$ is represented by an appropriate path loss model.

$$\text{Theoretical } TX \text{ Power Limit} = \text{Boundary Limit} + (\text{Path Loss Between Closest Point of Approach (hot-spot) and Radio)} \quad \text{Eq. 1}$$

If the first radio device 12*a* were allowed to use the theoretical transmit power limit, the emissions from the first radio device 12*a* would consume the predetermined aggregate emission limit and no other radio devices 12 would be permitted to share the spectrum. Therefore, an adaptation is made to accommodate the operation of other radio devices. In one embodiment, the calculated theoretical transmit power limit is rounded down to the next nearest whole integer decibel level (or rounded down to the second nearest integer if the theoretical transmit power limit is less than a predetermined amount greater than an integer value, such as 0.2 dBm). In other embodiments, or of the calculated theoretical transmit power limit has an integer value, the calculated theoretical transmit power limit may be decreased by a predetermined amount, such as 1 decibel (e.g., 1.0 dBm), a half decibel (e.g., 0.5 dBm), or some other amount. Decreasing the calculated theoretical transmit power limit by rounding or by a predetermined amount provides margin for other radio devices 12 to operate using the same channel but without exceeding the predetermined aggregate emission limit at the tract boundary. It is noted that the radio devices that share the spectrum are tolerant of interference with one another and/or use mechanism to avoid interference, such as spreading codes, FDD or TDD.

As an representative example, it will be assumed that solving equation 1 for the first radio device 12 yields a theoretical transmit power limit of 29.6 dBm when the boundary limit is −80 dBm. Rounding the theoretical transmit power limit down to the closest integer results in a transmit power limit of 29 dBm. This result is communicated to the radio device 12*a* by the server 10 and serves as the transmit power limit for wireless communications carried out by the radio device 12*a*. The transmit power limit may be communicated as an operating parameter that forms part of a spectrum authorization provided to the radio device by the server 10. Reusing equation 1, the contribution of the radio device 12*a* at the corresponding hot-sport (hot-spot A) may be calculated. In this example, the transmit power limit of 29 dBm correlates to a contribution by the radio device 12*a* at hot-spot A of −80.6 dBm. Since the first radio device 12*a* is, so far, the only contributor, the aggregate amount of RF energy from the radio devices 12 is the same as the first radio device's contribution, or −80.6 dBm.

FIG. 4 shows the presence of the first radio device 12*a* and the second radio device 12*b* near the tract boundary. The second radio device 12*b* is located a distance $R_2$ from the tract boundary. The second radio device 12*b* makes a request for spectrum access from the server 10. The server 10 then returns a spectrum allocation (e.g., spectrum access credentials) containing a transmit power limit that is determined to keep emissions from the first and second radio devices 12*a*, 12*b* at the tract boundary at or below the predetermined aggregate emission limit.

Since the second radio device 12*b* is not the only radio device that is known to the server 10 to use or desire to use the shared spectrum, the server 10 may determine the transmit power limit for the second radio device 12*b* based on the operations of all probable contributors to the aggregate emissions at each hot-spot. A probable contributor is a radio device having emissions that have more than a predetermined contribution power level at the hot spot. The predetermined contribution power level may be selected to exclude radios that are sufficiently remote from the hot spot so as not to make meaningful contribution to the aggregate power at the hot-spot. An exemplary predetermined contribution power level may be one thousandth of the boundary limit (e.g., 0.1% of the boundary limit or a decibel level of 30 dBm less than the boundary limit, which in the example described thus far would be a predetermined contribution power level of −110 dBm). Thus, in the example described thus far, radios having a contribution at a hot-spot of −110 dBm or less will be omitted from the calculations for the hot-spot. When determining if a radio is a probable contributor, criteria and assumptions may be imposed. One exemplary criterion is that the radio must be within a specified distance from the hot-spot. Exemplary assumptions may include that the radio transmits with its maximum allowable transmit limit (e.g., a maximum transmit power specified by regulation for the radio type) and maximum antenna height (e.g., a maximum transmit power specified by regulation for the radio type).

A new hot-spot, hot-spot B, is established for the second radio device 12b at its closest point of approach. For purposes of example, it will be assumed that only the first radio device 12a and the second radio device 12b are probable contributors to the corresponding hot-spots A, B.

A theoretical transmit power limit for the requesting radio device 12b may be determined by solving equation 2 for each hot-spot to which the requesting radio device is a probable contributor and retaining the lowest value (the lowest value being the maximum theoretical transmit power limit for the requesting radio device 12b). When solving equation 2, the "sum of hot-spot contributions from each probable contributor radio" excludes the contribution of the requesting radio and each contribution is determined using an appropriate path loss model.

Theoretical *TX* Power Limit=(Boundary Limit −Sum of Hot-Spot Contributions from Each Probable Contributor Radio)+(Path Loss Between Hot-Spot and Requesting Radio)   Eq. 2

In order to leave room for addition radios, the maximum theoretical transmit power limit for the requesting radio device 12b may be adjusted, such as by rounding or reducing as described above.

Following the preceding example, the boundary limit less the contribution from the first radio device leaves a difference of 0.6 dBm at hot-spot A. The corresponding theoretical transmit power limit for hot spot A at the location of the requesting radio device 12b is 17.8 dBm. A higher theoretical transmit power limit may be present at hot-spot B. Therefore, even though the requesting radio device is physically closer to hot-spot B, the aggregate emissions at hot-spot A controls the allowable transmit power for the requesting radio device. The 17.8 dBm value may be rounded down to an operating parameter of 17 dBm as the allowable transmit power for the requesting radio device.

Although the hot-spot that drives the allowable transmit power for the requesting radio device in this example is derived from aggregate power at hot-spot A, aggregate contribution for each hot-spot may be maintained in a database for use in future calculations. For example, when a radio is removed (e.g., no longer uses the shared spectrum) or re-allocated (e.g., renews its operating parameters as described below) a revised transmit power value for all aggregation hot-spots to which the radio is a probable contributor may be recalculated. An exemplary data store for the foregoing example is presented in table 1.

TABLE 1

|  | Hot-Spot A | Hot-Spot B |
|---|---|---|
| Contribution from First Radio | −80.6 dBm | −84.0 dBm |
| Contribution from Second Radio | −89.8 dBm | −83.0 dBm |
| Aggregate | −80.1 dBm | −80.4 dBm |

FIG. 5 shows the presence of the first radio device 12a and the second radio device 12b near the tract boundary, along with newly arriving third radio device 12c. The third radio device 12c is located a distance $R_3$ from the tract boundary. The third radio device 12c makes a request for spectrum access from the server 10. The server 10 then returns a spectrum allocation (e.g., spectrum access credentials) containing a transmit power limit that is determined to keep emissions from the first, second and third radio devices 12a, 12b, 12c at the tract boundary at or below the predetermined aggregate emission limit.

A new hot-spot, hot-spot C, is established for the third radio device 12c at its closest point of approach. Then, the allowable transmit power for the third radio device 12c (as a requesting radio device) is determined. This may be carried in the same manner that the allowable transmit power for the second radio device 12b was determined. For purposes of example, it will be assumed that only the first, second and third radio devices 12a, 12b and 12c are probable contributors to the corresponding hot-spots A, B and C.

A theoretical transmit power limit for the requesting radio device 12c may be determined by solving equation 2 for each hot-spot to which the requesting radio device is a probable contributor and retaining the lowest value (the lowest value being the maximum theoretical transmit power limit for the requesting radio device 12c). Also, in order to leave room for addition radios, the maximum theoretical transmit power limit for the requesting radio device 12c may be adjusted, such as by rounding as described above.

Following the preceding example, the boundary limit less the contribution from the first and second radio devices leaves a difference of 0.1 dBm at hot-spot A. The corresponding theoretical transmit power limit at the location the requesting radio device is 15.9 dBm. A higher theoretical transmit power limit may be present at hot-spots B and C. Therefore, even though the requesting radio device is physically closer to hot-spots B and C, the aggregate emissions at hot-spot A controls the allowable transmit power for the requesting radio device. The 15.9 dBm value may be rounded down to an operating parameter of 15 dBm as the allowable transmit power for the requesting radio device.

The data store of contributions from the various radio devices may be revised. An exemplary data store for the foregoing example when the third radio device 12c is added is presented in table 2.

TABLE 2

|  | Hot-Spot A | Hot-Spot B | Hot-Spot C |
|---|---|---|---|
| Contribution from First Radio | −80.6 dBm | −84.0 dBm | −90.0 dBm |
| Contribution from Second Radio | −89.8 dBm | −83.0 dBm | −90.0 dBm |
| Contribution from Third Radio | −97.0 dBm | −95.0 dBm | −90.0 dBm |
| Aggregate | −80.0 dBm | −80.3 dBm | −85.2 dBm |

It may be observed that the aggregate power at hot-spot A in this example has reached the boundary limit. In this case, the server 10 may restrict access to additional devices until one or more radio devices renews its operating parameters. At that time, it is contemplated that the renewing device's transmit power limit will be reduced, thereby adding additional capacity. Alternatively, the server 10 may, as a proactive measure, downwardly adjust the transmit power limit of one or more of the radio devices and communicate the new power limit to the affected radio device(s). Exemplary radio devices that may have reductions in transmit power limit include the radio device responsible for the highest contribution to aggregate power, the most recently arriving radio device, the closest radio device, the radio device with the smallest operating area, etc.

In one embodiment, the radio devices 12 are required to renew the operating parameters that are received from the server 10. Renewal may be made on a periodic basis, such as every once an hour, every twelve hours, every 24 hours, or on some other schedule. In the case of mobile devices, renewal also may be made when the radio device moves more than a predetermined distance from the position for which the current operating parameters were determined. An exemplary predetermined distance for this purpose is 50 meters. If the radio device moves between initial registration and its first renewal or between renewals, the hot-spot corresponding the radio device may be adjusted and contribution values for each probable contributor to the adjust hot-spot may be re-determined.

In one embodiment, when a radio device submits a renewal request to the server 10, the server 10 recalculates the allowable transmit power limit for the radio device by treating the radio device as a newly arriving radio device. In this embodiment, the server 10 removes existing contribution values from the stored data and re-computes the theoretical transmit power limit at each hot-spot to which the radio device is a probable contributor. As previously described, the theoretical transmit power limit at each relevant hot-spot is determined, and then the lowest of these values is retained and adjusted to establish an allowable transmit power limit for the radio device. The server 10 communicates the allowable transmit power limit in a renewal response transmitted to the radio device.

In the foregoing example, when the first radio device 12a requested operating parameters from the server 10, the first radio device 12a was the only radio device present. But since that time, the second and third radio devices 12b and 12c commenced operation. When the first radio device 12a renews its operating parameters, the contributions of the second and third radio devices 12b and 12c will be taken into account. In this example, solving equation 2 for each hot spot, identifying the lowest theoretic transmit power limit (which corresponds to the limit associated with hot-spot A), and adjusting the lowest theoretic transmit power limit results in an allowable transmit power limit of 28 dBm for the first radio device 12a. In this example, the aggregate power at hot-spot A changes from −80.0 dBm to −80.9 dBm by the change in allowable transmit power limit from 29 dBm to 28 dBm. Also, the contribution from the first radio device 12a at the tract boundary at hot-spot A changes from −80.6 dBm to −81.6 dBm.

The change in the allowable transmit power limit for the renewing radio device allows for additional capacity to accept new radio devices that share the channel and/or to increase the allowable transmit power limit of the other radio devices. Increases to the allowable transmit power limit of the other radio devices may be made when those radio devices make renewal requests or may be made proactively by the server 10 by communicating new limits to the radio devices.

Since the renewal process is generally made in a round robin fashion, the renewal process results in iteratively adjusting the contributions of the various radio devices at the hot-spots. This leads to equitably allocating allowable transmit power limits among the contributing radio devices over time. This is demonstrated by the exemplary data shown in table 3 where allowable transmit power levels for the three radio devices 12a, 12b and 12c and aggregate power at hot-spot A are shown for each renewal event, which correspond to round robin renewals by the three radio devices. It is noted that event 1 corresponds to the initial registration of the first radio device 12a, event 2 corresponds to the initial registration of the second radio device 12b, and event 3 corresponds to the initial registration of the third radio device 12c. Thereafter, the events correspond to renewals of radio 12a, radio 12b and radio 12c in round robin fashion.

At renewal event 12, the system reaches steady state. Radio devices discontinuing use of the spectrum, moving radio devices, and new radio devices introduced to the system will impact these types of results.

TABLE 3

| Registration/Renewal Event | Allowable Transmit Power Limit | | | Aggregate at Hot-Spot A (dBm) |
|---|---|---|---|---|
| | Radio 12a (dBm) | Radio 12b (dBm) | Radio 12c (dBm) | |
| 1 (Radio 12a) | 29 | — | — | −80.6 |
| 2 (Radio 12b) | 29 | 17 | — | −80.1 |
| 3 (Radio 12c) | 29 | 17 | 15 | −80.0 |
| 4 (Radio 12a) | 28 | 17 | 15 | −80.9 |
| 5 (Radio 12b) | 28 | 20 | 15 | −80.3 |
| 6 (Radio 12c) | 28 | 20 | 21 | −80.1 |
| 7 (Radio 12a) | 27 | 20 | 21 | −80.8 |
| 8 (Radio 12b) | 27 | 21 | 21 | −80.5 |
| 9 (Radio 12c) | 27 | 21 | 23 | −80.3 |
| 10 (Radio 12a) | 26 | 21 | 23 | −80.9 |
| 11 (Radio 12b) | 26 | 23 | 23 | −80.5 |
| 12 (Radio 12c) | 26 | 23 | 24 | −80.3 |
| 13 (Radio 12a) | 26 | 23 | 24 | −80.3 |
| 14 (Radio 12b) | 26 | 23 | 24 | −80.3 |
| 15 (Radio 12c) | 26 | 23 | 24 | −80.3 |
| 16 (Radio 12a) | 26 | 23 | 24 | −80.3 |
| 17 (Radio 12b) | 26 | 23 | 24 | −80.3 |
| 18 (Radio 12c) | 26 | 23 | 24 | −80.3 |
| 19 (Radio 12a) | 26 | 23 | 24 | −80.3 |
| 20 (Radio 12b) | 26 | 23 | 24 | −80.3 |
| 21 (Radio 12c) | 26 | 23 | 24 | −80.3 |
| 22 (Radio 12a) | 26 | 23 | 24 | −80.3 |
| 23 (Radio 12b) | 26 | 23 | 24 | −80.3 |
| 24 (Radio 12c) | 26 | 23 | 24 | −80.3 |
| 25 (Radio 12a) | 26 | 23 | 24 | −80.3 |

C. CONFIRMATION

A simulation was performed to validate the approach of using a finite element analysis instead of assessing aggregate power along the tract boundary in an unbounded continuous manner. This analysis confirmed that peaks in aggregate power occur at the closest points of approach for the radio devices. The simulation involved four radios having locations relative to a tract boundary identified in Table 4 and shown in FIG. 6A.

TABLE 4

| Radio | x (Distance along tract boundary) | y (Distance from tract boundary) | Distance to hot spot 1 | Distance to hot spot 2 | Distance to hot spot 3 | Distance to hot spot 4 |
|---|---|---|---|---|---|---|
| Radio1 | 10 | 120 | 120.0 | 126.5 | 144.2 | 241.9 |
| Radio2 | 50 | 60 | 72.1 | 60.0 | 72.1 | 180.3 |
| Radio3 | 90 | 90 | 120.4 | 98.5 | 90.0 | 158.1 |
| Radio4 | 220 | 160 | 264.0 | 233.5 | 206.2 | 160 |

Operating parameters of the four simulated radios are shown in Table 5.

TABLE 5

| Radio | Antenna Height (m) | Frequency (MHz) | Wavelength (m) | Path Loss (dB) to hot spot 1 | Path Loss (dB) to hot spot 2 | Path Loss (dB) to hot spot 3 | Path Loss (dB) to hot spot 4 | TX Power |
|---|---|---|---|---|---|---|---|---|
| Radio1 | 30 | 3560 | 0.0843 | 109.6 | 110.4 | 112.4 | 120.3 | 25.0 |
| Radio2 | 30 | 3560 | 0.0843 | 101.8 | 99.0 | 101.8 | 115.8 | 15.0 |

TABLE 5-continued

| Radio | Antenna Height (m) | Frequency (MHz) | Wavelength (m) | Path Loss (dB) to hot spot 1 | Path Loss (dB) to hot spot 2 | Path Loss (dB) to hot spot 3 | Path Loss (dB) to hot spot 4 | TX Power |
|---|---|---|---|---|---|---|---|---|
| Radio3 | 30 | 3560 | 0.0843 | 109.7 | 106.6 | 105.2 | 113.8 | 17.0 |
| Radio4 | 30 | 3560 | 0.0843 | 121.7 | 119.8 | 117.9 | 114.0 | 30.0 |

Contributed power from the radios at the various hot spots is shown in Table 6.

TABLE 6

| Radio | Contributed Power at hot spot 1 | Contributed Power at hot spot 1 | Contributed Power at hot spot 2 | Contributed Power at hot spot 2 | Contributed Power at hot spot 3 | Contributed Power at hot spot 3 | Contributed Power at hot spot 4 | Contributed Power at hot spot 4 |
|---|---|---|---|---|---|---|---|---|
| Radio1 | −84.6064 | 3.46226E−09 | −85.4123 | 2.87587E−09 | −87.4191 | 1.81170E−09 | −95.3287 | 2.93175E−10 |
| Radio2 | −86.8150 | 2.08191E−09 | −84.0027 | 3.97862E−09 | −86.8154 | 2.08191E−09 | −100.832 | 8.25511E−11 |
| Radio3 | −92.6593 | 5.42083E−10 | −89.5843 | 1.10045E−09 | −88.2055 | 1.51166E−09 | −96.8260 | 2.07685E−10 |
| Radio4 | −91.6686 | 6.80983E−10 | −89.7870 | 1.05027E−09 | −87.8847 | 1.62753E−09 | −84.0074 | 3.97433E−10 |
| Sum | | 6.76723E−09 | | 9.00522E−09 | | 7.03280E−09 | | 4.55774E−09 |
| Sum | | −81.6958 | | −80.4550 | | −81.5287 | | −83.4125 |

FIG. 6B is a plot of aggregated power along the simulated tract boundary for the distribution of radios as shown in FIG. 6A. It may be observed that, at no point along the boundary, does an aggregated value between hot-spots exceed a hot-spot value or exceed the aggregation limit for the simulation of −80 dBm. The result is maintained even when the radios are moved to different x-y positions.

D. ADJUSTMENTS BASED ON RANDOM PHASE

The foregoing approach is described under the assumption that the emissions from all radios are in phase and the amplitudes of their emissions aggregate to the maximum extent possible. Even under this assumption, it has been demonstrated that the radios may be effectively managed to control aggregate power along the tract boundary while still transmitting with sufficiently high transmit power to perform wireless communications tasks. It would be extraordinarily rare, however, that the emissions from the radios combine in this manner. That is, there is more than reasonable likelihood that the emissions from the radios will have random phase relative to one another. In this case, there will be some degree of signal cancellation. The statistically predictable cancellation may be leveraged to allow the radios to operate with higher allowable transmit power levels than the allowable transmit power levels determined under the approach described above. In one embodiment, a probability function may be applied to lower the predetermined aggregate emission limit at the tract boundary. In another embodiment, a probability function may be applied to lower the respective calculated contribution values for the radios. In another embodiment, a probability function may be applied to raise the respective allowable transmit power levels for the radios.

It is well-known that the probability of the magnitude of a sum of vectors with random phase over an interval of $2\pi$ (2 pi) follows Rayleigh's distribution:

$$P_N(R) \sim \frac{2R}{N} e^{-R^2/N}$$

Figure 7:
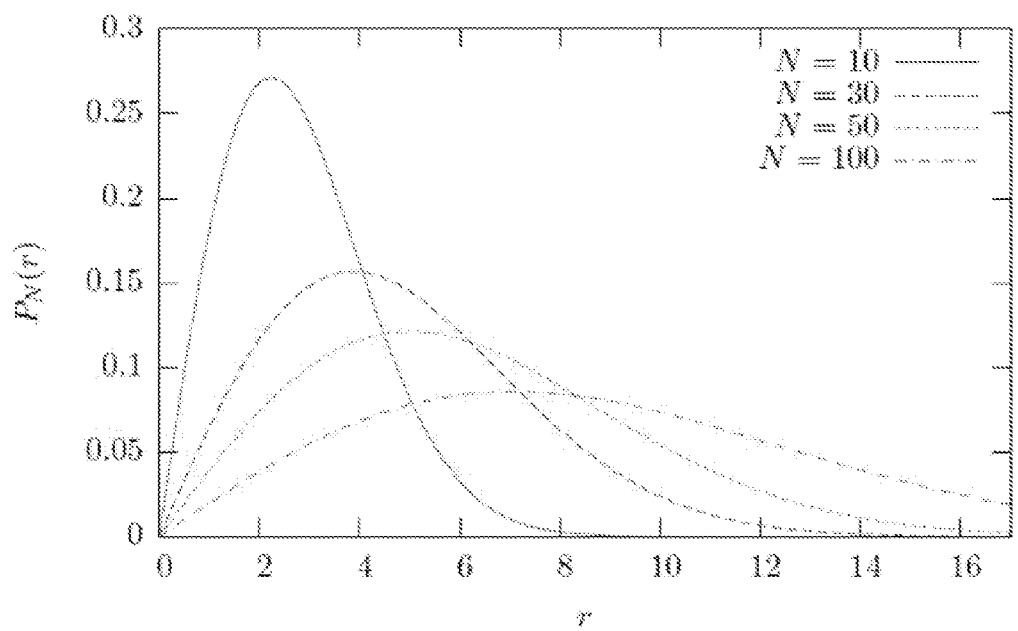
FIG. 7 is a graph showing Rayleigh's asymptotic approximation for $P_N(r)$ in Pearson's random walk.

It is clear that as the number of individual vectors (or radios in a system) grows larger, the probability of the resultant magnitude (aggregate) of the sum of vectors becomes a smaller proportion of the sum of individual vector magnitudes and does not simply grow as $10*\log(N)$. This is graphically shown in FIG. 7, which shows Rayleigh's asymptotic approximation of $P_N(r)$ in Pearson's random walk.

Figure 8:
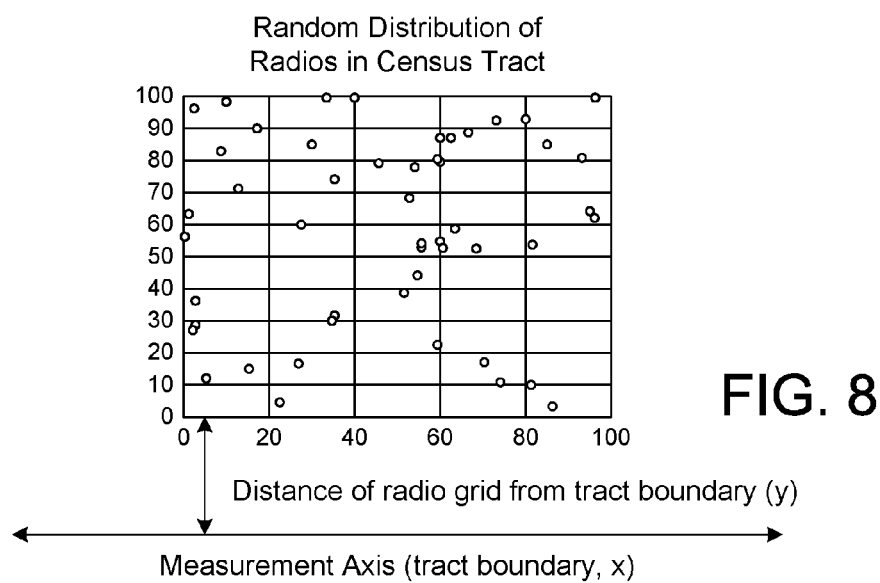
FIG. 8 is a distribution of sinusoidal sources derived via a Monte Carlo Analysis to investigate the "real world" effects of signal aggregation.
Figure 9:
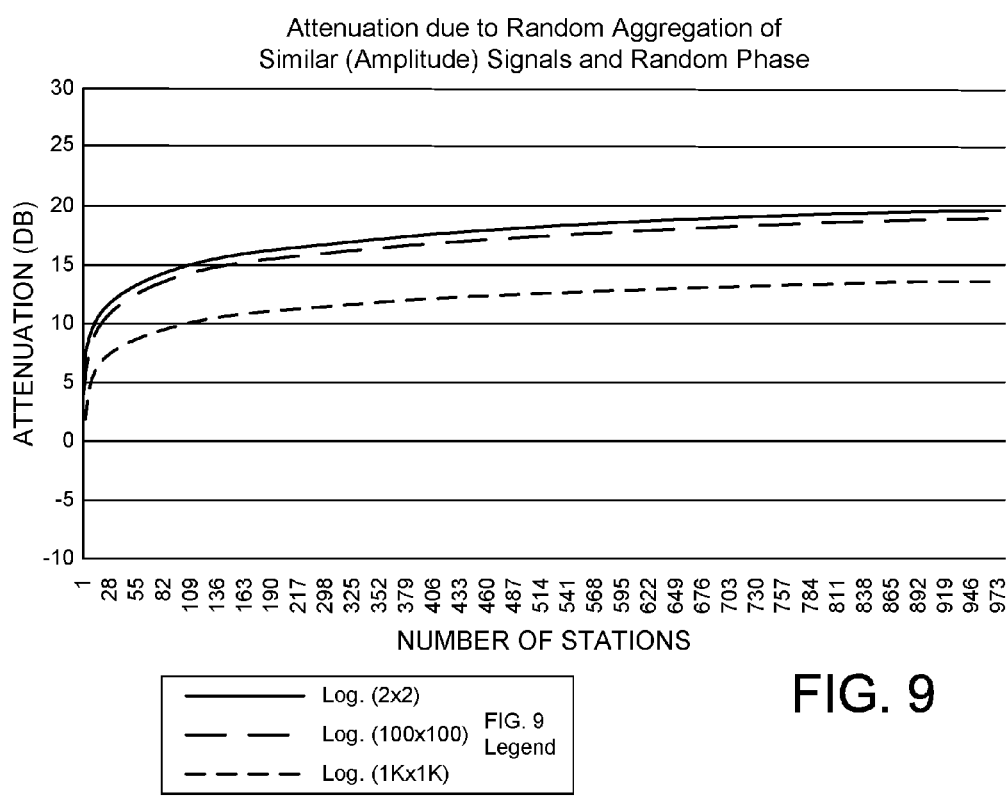
FIG. 9 is a plot, derived through empirical analysis, of signal aggregation behavior.

With additional reference to FIG. 8, shown is a distribution of multiple sinusoidal sources with random phase derived via a Monte Carlo Analysis to investigate the "real world" effects of signal aggregation. FIG. 9 is a plot of the results of an empirical analysis of the signal aggregation from the emissions of the sources, such as those shown in FIG. 8. Variation in signal magnitude induced by multiple, distributed radios at an aggregation point was varied through path loss, induced by random distance between the source(s) and aggregation point along a tract boundary. The analysis included various numbers of radio sources (from 1 to 1000) with similar peak amplitude (variation=1 dBm) and randomly distributed within a rectangular grid of 2×2 m, 100×100 m and 1000×1000 m. Attenuation in DB for the 2×2 m grid was 2.1935 ln(x)+4.133, attenuation in DB for the 100×100 m grid was 2.1778 ln(x)+3.4981, and attenuation in DB for the 1000×1000 m grid was 1.6537 ln(x)+1.8936. The analysis was performed for random phase (0 to 2 pi) and aligned phase (no destructive interference).

The result of signal aggregation at a point along the tract boundary, due to a significant number of devices, is shown. The data depict the attenuation, or difference between the expected signal power that would be obtained for constructive interference (all randomly distributed signal sources have equal phase) and the random effects of destructive interference (due to random phase) at the aggregation point.

The data show:
Increasing aggregated power as N is increased.
Decreasing attenuation as the signal sources become less clustered or vary more in amplitude.
Reduction in aggregated power variability as the distribution of signal sources becomes more clustered.
Reduction in aggregated power variability as N is increased.

Therefore, the effects of random phase may be used in deriving expected values of aggregated signal sources (with random phase) as a function of known characteristics (amplitude, location and probability). This behavior also may be applied to augment the previously described technique to ensure that a set of distributed signal sources are configured with allowable transmit power levels such that their aggregated signal power at a specified aggregation point does not exceed a specified value at a given probability.

Deriving the probability distribution function for set of signal sources with random amplitude and phase may be accomplished using various analytical methods such as those described in A. Abdi, H. Hashemi, S. Nader-Esfahani, "On the PDF of the Sum of Random Vectors," IEEE Transactions on Communications, Volume 48, No. 1, January 2000, or by more direct empirical methods that employ a Monte Carlo analysis technique, for example.

Regardless of which approach is selected, there are several factors that may be considered in the process. An example is used to illustrate. In the example, n-randomly positioned radio sources are positioned such that they contribute time varying fields $A_n e^{(j\omega + \phi n)}$ at an aggregation point. The values assumed for $A_n$ are as follows (in dBm): [−81, −88, −95, −92, −95]. When these values are combined with the same phase, the resultant amplitude, A is −79.67 dBm. This is the maximum value that can be achieved by combing vectors with the same phase, but with extremely low probability. But when the same five vectors are combined with random phase, the aggregate value results in a distribution characterized by the probability and cumulative distribution functions shown in FIG. 10.

The shape of the distribution is affected by the distribution of magnitudes $A_n$. In this example it was determined that the aggregate amplitude does not exceed −80.15 dBm ninety percent of the time. The plot of FIG. 10 was created using 5000 random phase ($\phi_n$) data sets. This is significant since the aggregated value (90% probability) is about 0.5 dBm less than the value derived using a simple worst case analysis. The results in this example are repeatable to within 0.02 dBm more than ninety percent of the time.

The actual distribution of radio devices may be used to establish probability and cumulative distribution functions for a specific situation of radio devices that seek spectrum access. Using this information, transmit power limits for each radio device may be established such that the aggregated power at a specific point does not exceed a threshold at a specified probability. Alternatively, the aggregate power limit (boundary limit) may be adjusted.

Also of note is that when the amplitudes of contributing sources (An) vary significantly, their effect on the aggregated value is inversely proportional to their amplitude. As such, if a 1 dBm margin is available for contribution by individual sources to the aggregated value, this may result in about 1 additional dBm of amplitude for contributors with similar magnitude, but may result in significant margin (several to tens of dBm) for sources that are contributing at much lower than the aggregated value.

Figure 10:
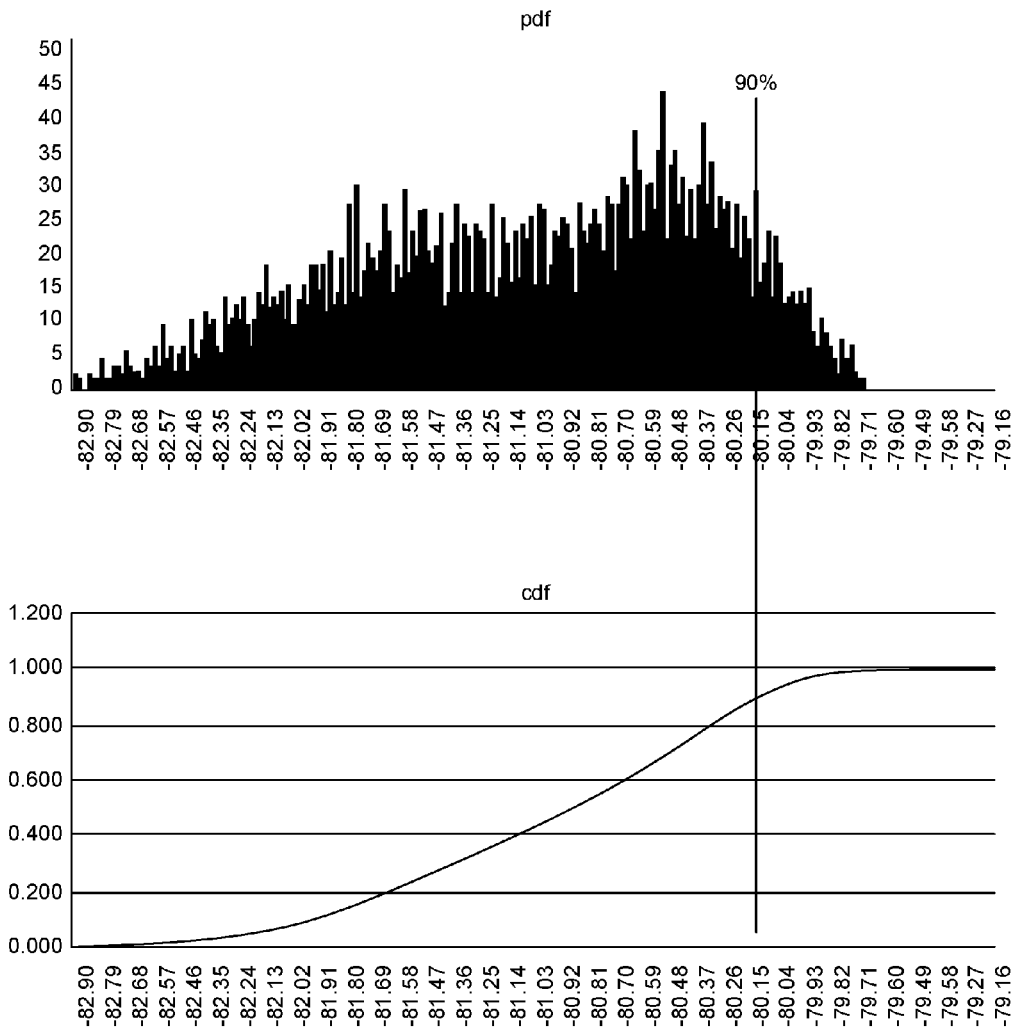
FIG. 10 shows plots of probability and cumulative distribution functions that characterize signal aggregation in a random phase scenario.

Although the foregoing example incorporates a small number of sources (5), resulting in a about a 0.5 dBm increase in additional margin from a worst case analysis, the margin becomes significantly more as the number or sources (An) and proximity is increased (as shown in FIG. 10).

E. SUMMARY OF SELECTED EMBODIMENTS

E(1). New Radio Handling

An approach to determining allowable transmit power limit allocation for a radio that newly requests spectrum access is summarized in this section. Basic steps in allocating allowable transmit power limits include:
  A closest point of approach (hot spot) for the requesting radio relative to the tract boundary is defined. For this hot spot, a maximum allowable transmit power (TX power) based on a signal induced by the radio at the hot spot is determined using: TX Power=Signal Limit at Boundary+Path Loss to Radio.
  For each pre-existing hot spot for other radios at which the requesting radio device is a potential contributor, the system calculates maximum allowable transmit power (TX power) using: TX Power=Signal Limit at Boundary−hot spot contributions from all other radios+Path Loss to Requesting Radio. The radio is a potential contributor to a hot spot if it has the ability to make a meaningful contribution to the aggregate signal power value at the location of the hot spot along the tract boundary. For example, a radio may make a meaningful contribution if its contributed power is at least 1/1000 of the boundary limit (e.g., contribution at the hot spot is greater than the boundary limit less 30 dBm).
  The smallest value determined in the two preceding steps is identified and rounded down or reduced by an accommodation factor. The resulting value becomes the allowable transmit power for the requesting radio. Rounding down or reducing the transmit power value leaves margin for additional radios to be allocated shared spectrum within the vicinity, while maintaining the aggregated power below the specified limit at the boundary.
  The system may store the radio's contribution values to each hot spot in a data structure (e.g., tables) and update the tables with changes in allocations or other operating conditions.
  An exemplary hot spot database structure for a radio ("Radio1") that is a potential contributor to three hot spots (for Radio1, Radio2 and Radio3) is as follows:
    Radio1 (ID), HS1 power contribution, HS1 Location (synthesized for Radio 1), Allowable TX power for Radio1 relative to HS1
    Radio1 (ID), HS2 power contribution, HS2 Location (synthesized for Radio 2), Allowable TX power for Radio1 relative to HS2
    Radio1 (ID), HS3 power contribution, HS3 Location (synthesized for Radio 3), Allowable TX power for Radio1 relative to HS3

E(2). Radio Power Selection

A radio may select to use a transmit power that is less than the radio's allocated transmit power limit. In this case, the radio device may report the actually used transmit power level to the server and the server may revise the radio's contributions to each hot spot to leave additional margin for other radio devices.

E(3). Radio Allocation Removal

If a radio stops wireless communications on the shared channel or the radio's authorization to use the channel expires (e.g., the renewal time passes without obtaining renewed spectrum access credentials), then the radio's contribution to aggregate power at the tract boundary during future transmit power limit determinations may be ignored. In one embodiment, the hot-spot contribution entries for the radio are removed from the data store. This allows radios within proximity of the hot spots formerly affected by the radio to have the potential for a higher (better) transmit power allocation upon re-request or renewal.

E(4). Renewal (Radio Re-Allocation)

When a radio requests renewed spectrum access credentials, the generation of the allowable transmit power limit for the renewal may be handled by the server in the same as the generation of the allowable transmit power limit for the initial request from the radio. In one embodiment, however, some calculations may be omitted by leveraging already determined information, such reusing the prior determination of the hot spots to which the radio device contributes. If new radios arrived since the last allocation to the renewing radio device, evaluation against the new hot spots will be added.

E(5). Phase Considerations

Aggregated power limits determined at boundaries may be determined in a worst case fashion by summing individual magnitudes of the amplitude of signal contributions at a hot spot (no consideration for phase and the effects of cancellation). Alternatively, a probability distribution function (PDF) may be developed based on known amplitude of individual contributing signals and random phase. The PDF may be applied to the solution to increase allowable transmit power. Further, a confidence factor may be applied based on the number of iterations used in synthesizing the PDF for each hot spot.

E(6). Adjacent Channel Operations

The described approaches consider co-channel operations on a channel shared among the radio devices. The techniques may be extended to consider the contribution of emissions by other radios on one or more adjacent channels.

F. CONCLUSION

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to some radio device characteristics, which could include one or more of modulation schemes, harmonic considerations, frequency bands or channels used by the electronic device, the type of data or information that is transmitted, how the electronic device uses received information, and other similar communications considerations. Thus, the systems and methods have application in any suitable environment.

Although certain embodiments have been shown and described, it is understood that equivalents and modifications falling within the scope of the appended claims will occur to others who are skilled in the art upon the reading and understanding of this specification.

What is claimed is:

1. A method of managing spectrum that is shared by two or more radio devices that operate near a boundary of a tract, emissions by the radio devices at the boundary not to exceed a predetermined aggregate emission limit, the method comprising:
    receiving a request for spectrum access by one of the radio devices;
    for each radio device, including the requesting radio device and radio devices previously granted spectrum access to the shared spectrum, determining a closest point of approach to the boundary;
    determining an aggregate contributed power at each closest point of approach by the emissions from the radio devices previously granted spectrum access to the shared spectrum;
    for each closest point of approach, determining a transmit power limit for the requesting radio device as a function of the corresponding aggregate contributed power and the predetermined aggregate emission limit;
    determining a smallest one of the transmit power limits; and
    granting spectrum access to the requesting radio device to use the shared spectrum, the granted spectrum access including an authorized transmit power limit for operation of the requesting radio device, the authorized transmit power limit not exceeding the smallest one of the transmit power limits.

2. The method of claim 1, wherein the transmit power limit for each closet point of approach is determined by subtracting the corresponding aggregate contributed power from the predetermined aggregate emission limit and adding a path loss value between the requesting radio device and the closet point of approach.

3. The method of claim 1, wherein the authorized transmit power limit is the smallest one of the transmit power limits less an accommodation factor amount that allows for radio devices arriving after the requesting radio device to operate using the shared spectrum.

4. The method of claim 3, wherein the accommodation factor amount reduces the smallest one of the transmit power limits by downward rounding.

5. The method of claim 3, wherein the accommodation factor amount reduces the smallest one of the transmit power limits by a predetermined amount.

6. The method of claim 1, wherein a renewal request for renewal of spectrum access that is received from one of the radio devices is treated as a request for spectrum access as if the radio device is newly arriving.

7. The method of claim 1, further comprising excluding from the determinations of the method radio devices that are not probable contributors to the predetermined aggregate emission limit.

8. The method of claim 7, wherein excluded radio devices are radio devices that contribute less than a predetermined amount to the predetermined aggregate emission limit.

9. The method of claim 1, wherein each closest point of approach is located at a point along the boundary having a shortest geographic distance between the corresponding radio device and the boundary.

10. The method of claim 1, wherein each closest point of approach is located at a point along the boundary that is determined to receive a highest induced power from the corresponding radio device.

11. The method of claim 1, wherein each radio device renews its respective spectrum access if moved more than a predetermined distance or if a predetermined amount of time elapses from the grant of spectrum access to the radio device.

12. The method of claim 1, further comprising making an adaptation to account for phase differences among the radio devices by modifying at least one of the predetermined aggregate emission limit, the aggregate contributions at each closet point of approach, or the authorized transmit power for the requesting radio device.

13. The method of claim 12, wherein the adaptation is made according to a random phase probability distribution determined for the radio devices.

14. A spectrum management system that manages spectrum that is shared by two or more radio devices that operate near a boundary of a tract, emissions by the radio devices at the boundary not to exceed a predetermined aggregate emission limit, the system comprising:
a communications interface over which communication with the radio devices is carried out; and
a processor that executes logical instructions to:
receive a request for spectrum access by one of the radio devices;
for each radio device, including the requesting radio device and radio devices previously granted spectrum access to the shared spectrum, determine a closest point of approach to the boundary;
determine an aggregate contributed power at each closest point of approach by the emissions from the radio devices previously granted spectrum access to the shared spectrum;
for each closest point of approach, determine a transmit power limit for the requesting radio device as a function of the corresponding aggregate contributed power and the predetermined aggregate emission limit;
determine a smallest one of the transmit power limits; and
grant spectrum access to the requesting radio device to use the shared spectrum, the granted spectrum access including an authorized transmit power limit for operation of the requesting radio device, the authorized transmit power limit not exceeding the smallest one of the transmit power limits.

15. The system of claim 14, wherein the transmit power limit for each closet point of approach is determined by subtracting the corresponding aggregate contributed power from the predetermined aggregate emission limit and adding a path loss value between the requesting radio device and the closet point of approach.

16. The system of claim 14, wherein the authorized transmit power limit is the smallest one of the transmit power limits less an accommodation factor amount that allows for radio devices arriving after the requesting radio device to operate using the shared spectrum.

17. The system of claim 16, wherein the accommodation factor amount reduces the smallest one of the transmit power limits by at least one of downward rounding or a predetermined amount.

18. The system of claim 14, wherein radio devices that are not probable contributors to the predetermined aggregate emission limit are excluded from the determinations made by the processor.

19. The system of claim 14, wherein each closest point of approach is located at a point along the boundary having a shortest geographic distance between the corresponding radio device and the boundary or is located at a point along the boundary that is determined to receive a highest induced power from the corresponding radio device.

20. The system of claim 14, wherein the processor further adapts for phase differences among the radio devices by modifying at least one of the predetermined aggregate emission limit, the aggregate contributions at each closet point of approach, or the authorized transmit power for the requesting radio device.

* * * * *